(12) United States Patent
Chen et al.

(10) Patent No.: US 6,841,794 B2
(45) Date of Patent: Jan. 11, 2005

(54) DIELECTRIC EMITTER WITH PN JUNCTION

(75) Inventors: Zhizhang Chen, Corvallis, OR (US); Hung Liao, Corvallis, OR (US); Alexander Govyadinov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/369,365

(22) Filed: Feb. 18, 2003

(65) Prior Publication Data

US 2004/0159829 A1 Aug. 19, 2004

(51) Int. Cl.[7] ............................ H01L 29/06; H01L 29/12
(52) U.S. Cl. ............................................ 257/10; 257/11
(58) Field of Search ........................ 257/10–11, 77–78; 438/20

(56) References Cited

U.S. PATENT DOCUMENTS

| 5,021,854 | A | | 6/1991 | Huth |
| 5,760,417 | A | | 6/1998 | Watanabe et al. |
| 5,831,380 | A | * | 11/1998 | Van Zutphen et al. ...... 313/422 |
| 6,198,210 | B1 | * | 3/2001 | Kroon et al. .................. 257/10 |

* cited by examiner

*Primary Examiner*—Cuong Nguyen

(57) ABSTRACT

A method for emitting electrons includes the steps of applying a voltage to an electron source to cause hot electrons to be generated with the source, and applying an electric field to cause at least a portion of the hot electrons to be emitted from the electron source.

26 Claims, 6 Drawing Sheets

DIELECTRIC EMITTER WITH PN JUNCTION

FIELD OF THE INVENTION

The invention is in the microelectronics field. The invention particularly concerns emitters and devices incorporating emitters.

BACKGROUND OF THE INVENTION

Emitters have a wide range of potential applicability in the microelectronics field. An emitter emits electrons in response to an electrical signal. The controlled emissions form a basis to create a range of useful electrical and optical effects. Prior conventional emitters include spindt tip cold cathode devices as well as flat emitters.

Challenges presented by spindt tip emitters include their manufacturability and stability over their service life. Manufacturing of spindt tip emitters requires a number of relatively difficult deposition steps, with the result that it is generally expensive and time consuming. Once formed, a tip may be unstable as it can change as it is operated, and is subject to damage if not operated in high vacuum.

Traditional flat emitters are comparably advantageous because they present a larger emission surface and can be operated in less stringent vacuum environments. Flat emitters include a dielectric emission layer that responds to an electrical field created by a potential applied between an electron source and a thin metal layer on either side of a dielectric layer. Electrons travel from the electron source to the conduction band of the dielectric somewhere in the dielectric layer. Once into the conduction band, the electrons are accelerated towards the thin metal. The electrons then travel through the thin metal and exit the emitter.

Problems and unresolved needs remain with flat emitters, however.

SUMMARY OF THE INVENTION

According to the invention, an emitter includes a PN junction, a conducting layer, and a dielectric layer sandwiched between the PN junction and the conducting layer.

DETAILED DESCRIPTION OF THE INVENTION

The present invention is directed to emitters, emitter devices, methods for emitting electrons, and methods for making emitters. An exemplary method of the invention includes a two step emission process wherein a PN junction is reverse biased to generate hot electrons, and a high electric field then applied to the PN junction to cause at least a portion of the hot electrons to be emitted. An exemplary emitter of the invention includes a PN junction with a thin dielectric layer formed over a portion of its surface. A thin metal layer is then formed over the dielectric layer. When the PN junction is reverse biased, hot electrons are generated. Applying a voltage to the thin metal layer creates an electric field across the thin dielectric, and causes a portion of the hot electrons to tunnel through the thin dielectric layer and to be emitted. Other exemplary invention embodiments may be directed to emitters, methods for making emitters, and devices incorporating an emitter, with examples including an integrated circuit, a display device, and a memory device.

Figure 1:
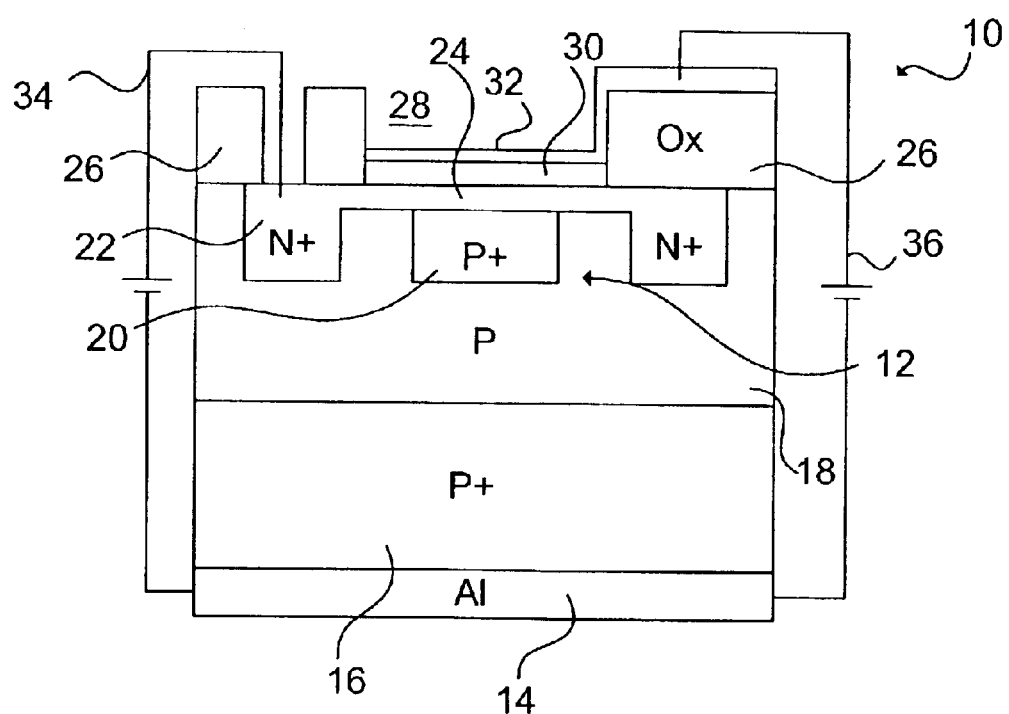
FIG. 1 is a schematic cross section of a preferred embodiment emitter of the invention.

Turning now to the drawings, FIG. 1 shows a preferred emitter embodiment of the invention in cross section generally at 10. The emitter 10 includes the PN junction shown generally at 12. A conducting layer 14 that may be made of Aluminum, for example, forms a base of the PN junction 12. The exemplary PN junction 12 also includes a first P+ silicon region 16, a P silicon region 18, and a second P+ silicon region 20 arranged generally as shown. The P+ region 20 is generally cylindrical and is surrounded about its perimeter by a portion of the P region 18.

A generally ring shaped N+ silicon region 22 is near the upper surface of the PN junction 12. Interior to the ring shaped N+ region 22 is a shallower second N+ silicon region 24. The shallow N+ region 24 may have a thickness of between about 50 and 200 Angstroms, and by way of particular example may be about 100 Angstroms thick. The shallow N+ region 22 preferably has a top surface that is substantially flat. The term "substantially flat" as used herein with reference to a surface is intended to broadly refer to a condition of a surface that is substantially free of bumps, ridges, and other irregularities.

The P+ and P regions 16–20, as well as the N+ regions 22–24 are made of an electron source, with silicon and poly silicon being exemplary materials. As will be appreciated by those skilled in the art, creation of the N+, P+, and P regions 16–24 is achieved through doping of the silicon with a relatively small number of impurity atoms. As used herein a "+" indicates an enhanced level of doping. Factors such as the type and concentration of the doping impurity and the energy used in implanting the impurity determines whether a region becomes an N/N+ or P/P+ region.

A dielectric layer 26 is formed on a top surface of the PN junction, and preferably in a generally circular or ringed shape to define a well 28. Exemplary dielectrics include nitrides and oxides of Si or Ti. The dielectric layer 26 and its interior well 28 may be formed using a standard formation process such as deposition with masking or the like. Within the well 28, a thin dielectric layer 30 is formed over the shallow N+ region 24. The thin dielectric layer 30 may be made of the same material as the dielectric layer 26, or may be made of a different material.

Designers applying the invention will understand that an optimized thickness of the thin dielectric layer 30 produces maximum emission efficiency. The thin dielectric layer 30 may have a thickness of between about 5 to about 25 nm for example, and by way of particular example may be about 100 Angstroms thick. Thinner layers reduce the tunneling resistance of the layer and produce emissions at lower voltages, while increasing the thickness increases its tunneling resistance. The layer 30 may be made of a low-K dielectric for some applications. One low K dielectric layer 30 is a porous layer having nano-size spacing to enhance tunneling. The layer 30 can be made porous by methods generally known in the art.

A conductor layer 32 is formed over the thin dielectric layer 30, and may extend out of the well 28 to overlie a portion of the layer 24 for convenience of formation and electrical connection. The conductor layer 32 may be made of a metal or metal alloy for example, with an exemplary layer 32 made of Al, Ta, Pt or alloys thereof. The portion of the conductor layer 32 that sits in the well 28 should be of a thickness large enough to provide a sufficient electric field and yet be thin enough so as to permit electron and photon emissions to escape through the layer 32. Artisans will appreciate that the thickness of the layer 32 portion in the well 28 may be selected according to various design factors such as applied bias voltage, thickness of the dielectric layer portion 30, materials of construction, end use of the emitter, and the like. By way of example, the portion of the layer 32 that sits in the well 28 may be between about 3 and 15 nm thick, and by way of particular example may be about 10 nm thick.

Also, the conductor layer 32 may be provided with nanohole openings to enhance emission level density. These nanohole openings will provide an emission path for electrons that tunnel through the dielectric layer portion 30 but that do not normally have sufficient energy to escape through the conductor layer 32. The nanohole openings may be created during an annealing process, and may have any of a variety of shapes, including but not limited to circular, crack-like, fissures, voids, serpentine, and the like. The nanohole openings may be uniform or distributed in size. The distribution of the nanoholes is preferably substantially uniform across the area of the conductor layer 32 in the well 28. Exemplary dimensions for the nanoholes include a width of about 1 to about 50 nanometers, and a length of about 10 to about 100 nanometers for crack-like and fissure shaped holes. Length is generally less important than width when considering crack-like and fissure shaped nanoholes. For nanoholes that are generally circular, or that may be more closely approximated as a circle than a crack, the holes may have a diameter of about 1 to about 50 nanometers.

Two connections are established, with a first 34 between the metal layer 14 and the N+ region 22, and a second 36 between the metal layer 14 and the conductor layer 30. The connection 34 has been illustrated schematically in FIG. 1 as extending through a passage in the oxide layer 26; this may be achieved in practice through etching or the like. The connection 34 functions to create two diodes: a contact diode and an emission diode. The contact diode has a terminal formed by the generally ring shaped N+ region 22. The shallower N+ region within the ring shaped contact diode forms the emission diode.

The N+ region 22 may be doped at a higher concentration than the shallower N+ region 24. A higher doping in the region 22 is generally desirable to enhance connection and reduce series resistance with regards to the connection 34. Doping in the shallower region 24 may be at a lower concentration selected to achieve a good PN junction emission efficiency, and to raise the breakdown voltage threshold. Particular doping concentrations will vary depending on factors as are generally known in the art such as the end use application, applied voltages, materials and doping impurities used, and the like.

By way of example, the region 22 may be doped with Arsenic at a concentration of about $5 \times 10^{15}$ atoms/cm$^2$, the shallower N+ region 24 may be doped with Arsenic at a concentration of about $2 \times 10^{15}$ atoms/cm$^2$, and the P+ region 20 may be doped with Boron at a dosage of about $3 \times 10^{13}$ atoms/cm$^2$. After doping the various regions may be thermally activated at about 950° C. for a period of about 30 minutes, for example.

Exemplary emitters of the invention offer many advantages and benefits. For example, the surface of the N+ region 24 may be substantially flat to achieve very low scatter of emitted electrons. Further, very high densities of emission centers may be achieved in the region 24. As used herein, the term "emission center" is intended to broadly refer to a site from which a hot electron may be emitted. The term "hot electron" as used herein is intended to broadly refer to an electron that is not in thermal equilibrium with the lattice. Emission centers from the region 24 may be of the order of the atom density at the surface. For example, it is believed that practice of the invention may potentially yield emission center densities in the doped N+ silicon region 24 of greater than about $10^5$ per micron$^2$, with a concentration of about $10^6$ per micron$^2$ believed possible.

The exemplary emitter 10 will be useful to illustrate an exemplary method of emitting electrons of the invention. A potential is applied across the connection 34 at a level below the avalanche voltage of the PN junction 12 to reverse bias the junction 12. This causes hot electrons to be generated within the junction 12, and in particular near the junction interface of the regions 24 and 20. The hot electrons travel at a velocity in the general direction towards the thin dielectric layer portion 30. Maintaining the applied potential below the avalanche voltage ensures that the PN junction will enjoy a relatively long service life and greatly reduces the possibility of junction breakdown.

Applying a potential across the connection 36 results in a voltage being applied to the conductor layer 32 and creating an electric field across the thin dielectric layer 30. The magnitude of the potential applied is preferably sufficient to generate a high field across the thin dielectric layer 30. By way of example only, a potential may be applied to cause a high field of at least about $10^7$ V/cm to be created across the dielectric layer 30. The high field causes a portion of the hot electrons to be accelerated from their initial velocity towards the dielectric layer 30, to tunnel through the thin dielectric layer 30, and to be emitted from the conductor layer 32. It is noted that the field across the layer 30 does not necessarily require that the connection 36 be between the base layer 14 and the conductor 32. For example, the connection 36 could link the layers 22 and 32 and still cause a field to be created across the layer 30.

The magnitudes of the potentials applied across the connections 34 and 36 may be selected based on design and application factors. Factors such as the materials used and the thickness of the PN junction layers 14–24, the dielectric layer 30, the conducting layer 32, the desired emission current, and the like may be considered. It is believed that methods and emitters of the invention can be configured to provide an emission efficiency of at least about 6%.

An exemplary method of the invention thereby uses a two stage emission process: a first stage applies a voltage to an electron source to generate hot electrons in the source, and a second stage applies an electric field to cause at least a portion of the electrons to be emitted from the electron source. In a preferred method embodiment, the electron source is a PN junction, with a voltage applied to it below its avalanche voltage to cause hot electrons to be generated. Methods of the invention offer several advantages. For example, by operating at a potential that is below the avalanche voltage of the PN junction, a relatively uniform turn-on voltage is available. This provides for improved emission current control. This may also be desirable, for example, when a plurality of emitters is present in a device. Other advantages of methods of the invention will be apparent to those knowledgeable in the art.

There are a wide-range of potential uses of emitters and methods for emitting electrons of the invention due to the general utility of emissions as a basis for electrical, electrochemical, and electro optical effects. Further, emitters of the invention are easily incorporated into integrated circuit fabrication techniques. A few particularly preferred applications of emitters and methods of emitting electrons of the invention will now be discussed by way of example.

Figure 2:
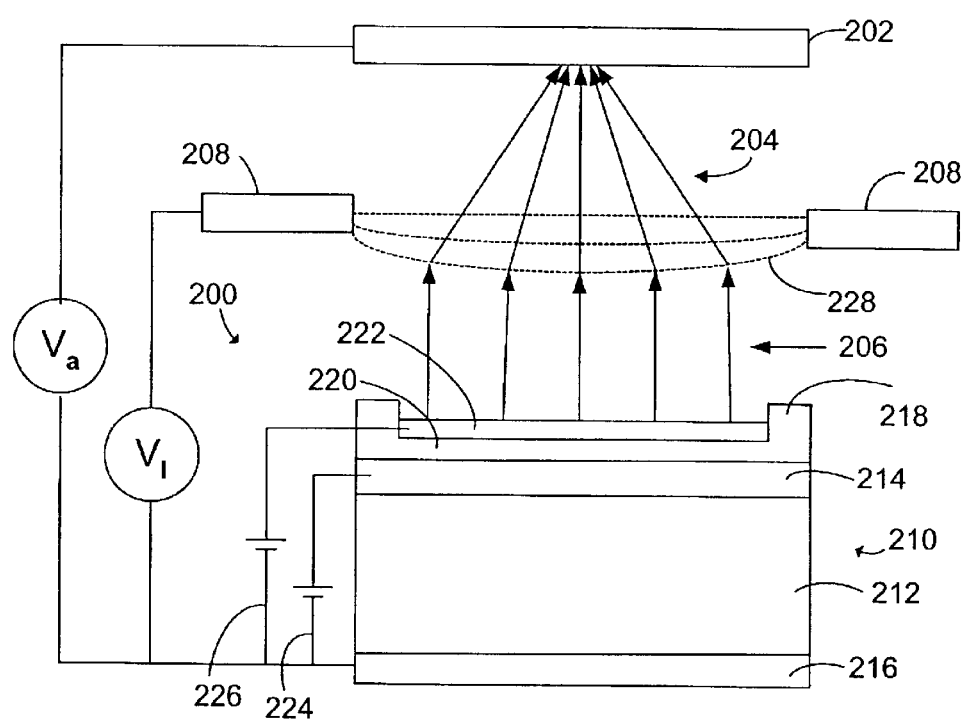
FIG. 2 is a schematic of a preferred embodiment emitter device of the invention.

FIG. 2 is an exemplary schematic of an exemplary emitter device of the invention including an emitter shown generally at 200 useful to generate focused electrons 204 to impact a target 202. In this application, the emissions 206 from the emitter 200 of the invention are focused by an electrostatic focusing device or lens 208. The emitter 200 generally comprises an electron source such as a PN junction shown generally at 210. The PN junction 210 includes a P region 212, an N region 214, and an underlying metal substrate layer 216. A generally circular or ring shaped dielectric layer 218 such as a metallic oxide overlies a portion of the N region 214, with a well defining therein. A thin dielectric layer portion 220 sits at the base of the well over a portion of the N region 214. A thin metal layer 222 is formed over the dielectric layer portion 220.

When a potential of less than the avalanche voltage is applied across the connection 224, hot electrons are generated near the junction interface. Applying a potential across the connection 226 charges the conductor layer 222 and subjects the thin dielectric layer portion 220 to a high electric field. The high field causes a portion of the hot electrons 206 to tunnel through the layer 220 and to be emitted from the conductor layer 222.

Within the lens 208, an aperture 228 in a conductor can be set at a predetermined voltage that can be adjusted to change the focusing effect of the lens 208. Those skilled in the art will appreciate that the lens 208 can be made from more than one conductor layer to create a desired focusing effect. The emissions 206 are focused by the lens 208 into a focused beam 204 directed onto the target anode medium 202. The target anode medium 202 is set at an anode voltage $V_a$. The magnitude of $V_a$ will depend on factors such as the intended emitter use, the distance between the anode medium 202 and the emitter 200, and the like.

For example, with the anode medium being a recordable memory medium for a storage device, $V_a$ might be chosen to be between about 500 and about 2000 volts. The lens 208 focuses the electron emissions 206 by forming an electric field in the aperture 220 in response to voltage $V_l$ within its aperture. By being set at a proper voltage difference from the potential across the connection 226, the emitted electrons 206 from the emitter 200 are directed to the center of the aperture and then further attracted to the anode medium 202 to form the focused beam 204.

The anode medium 202 may be configured as appropriate for any of several emitter applications, with two preferred applications including the target medium 202 being a visual display or a memory. If the anode medium 202 comprises a display, the focusing of the beam onto the anode medium 202 can be used to produce an effect to stimulate a visual display. Similarly, if the anode medium 202 comprises a memory medium, the electrochemical properties of the medium may be changed through the focused beam 204. These changes may be "coded" in a binary or other manner to store retrievable information, for instance by spatially organizing portions of the anode medium 202 and then selectively changing some of those portions through the emitted electrons 204. A visual display medium and a memory medium may employ a plurality of emitters 200 arranged in an array, and may employ a mover such as a micropositioner driven by a motor for moving one or the other of the emitter 200 and the anode medium 202 relative to the other. Also, a control circuit may be used to control the emitters 200 and/or other components.

Figure 3:
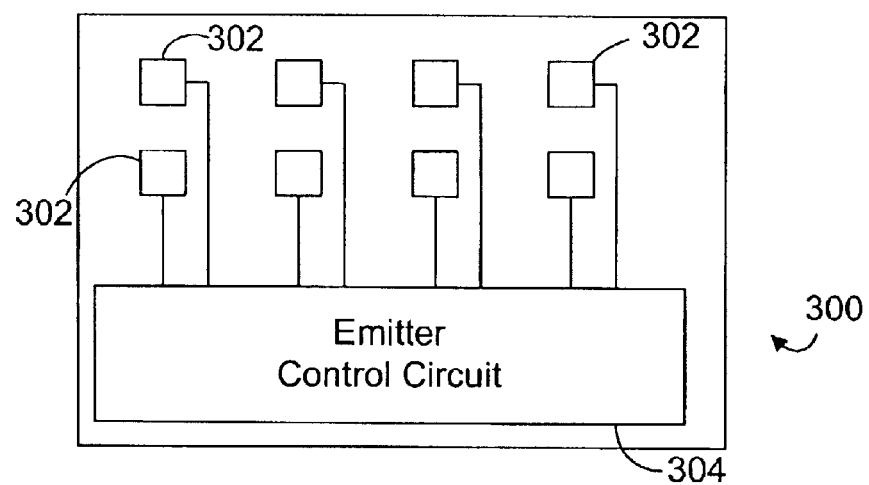
FIG. 3 is a schematic of a preferred embodiment integrated emitter circuit of the invention.

FIG. 3, for example, is a schematic of an exemplary integrated circuit embodiment 300 of the invention that includes at least one and preferably a plurality of integrated emitters 302 arranged in an array or other geometrical manner. An emitter control circuit 304 is integrated onto the integrated circuit 300 and used to operate the integrated emitters 302.

Figure 4:
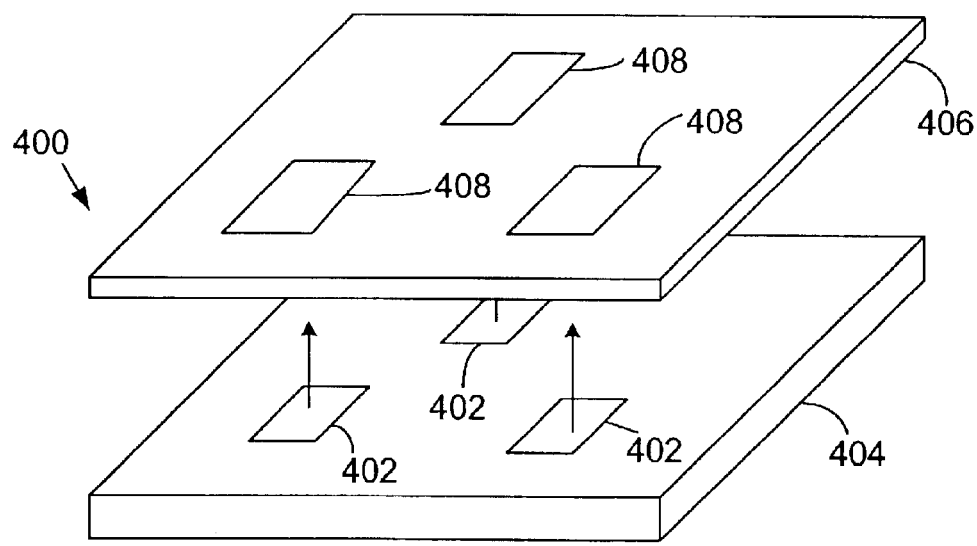
FIG. 4 is a schematic of a preferred embodiment emitter display device of the invention.

FIG. 4 is a schematic embodiment of a display application using an integrated emitter 400 of the invention. In particular, this embodiment entails a plurality of PN junction flat emitters 402 formed in an integrated circuit 404. Each of the emitters 402 emits electrons, as generally illustrated by the upwardly directed arrows of FIG. 4. An anode structure 406 having a plurality of individual pixels 408 that form a display 410 receives the emitted electrons. The pixels 408 are preferably a phosphor material that creates photons when struck by emissions from the emitters 402. Other components such as a power supply, a control circuit, and the like may also be provided.

Figure 5A:
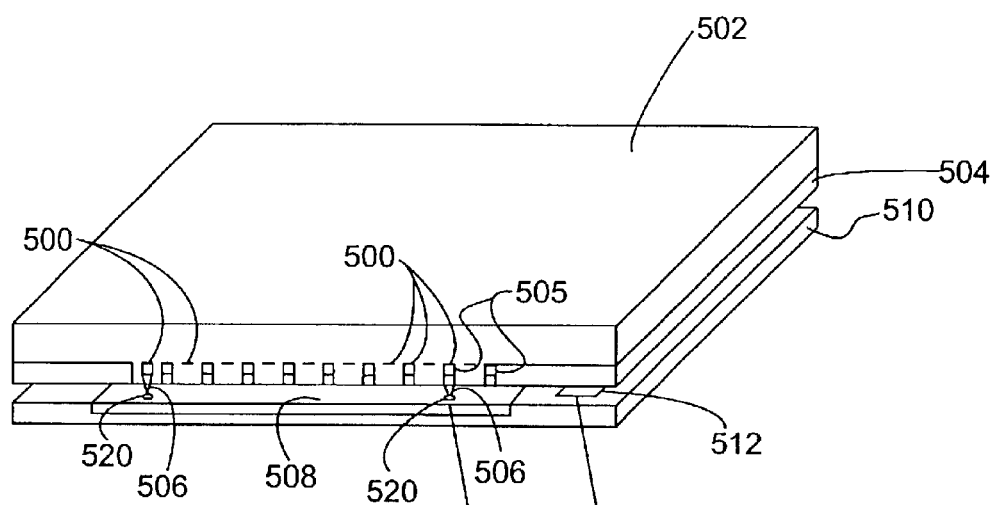
FIGS. 5A and 5B are schematics of a preferred embodiment emitter memory device of the invention.
Figure 5B:
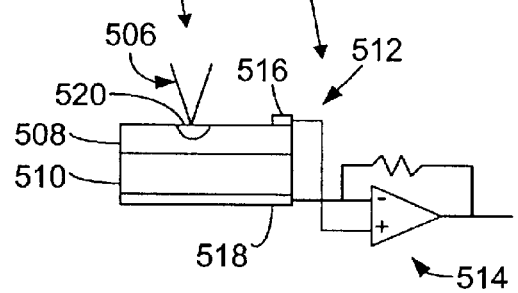

A particular preferred memory device is schematically shown in FIGS. 5A and 5B. The memory device includes a plurality of flat emitters 500 of the invention that include at least a PN junction, a dielectric layer, and a thin metal layer. In this exemplary embodiment, the plurality of emitters 500 are integrated into an integrated circuit (IC) 502. A lens array 504 of focusing mechanisms 505 that may be aligned with the integrated emitters 500 is used to create a focused beam 506 of electrons that affects a recording surface media 508. The surface media 508 is linked to a mover 510 that positions the media 508 with respect to the integrated emitters 500 and/or the lens array 504. Preferably, the mover 510 has a reader circuit 512 integrated within.

The reader circuit 512 is illustrated in FIG. 5B as an amplifier 514 making a first ohmic contact 516 to the media 508 and a second ohmic contact 518 to the mover 510, preferably a semiconductor or conductor substrate. When a focused beam 506 strikes the media 508, if the current density of the focused beam is high enough, the media is phase-changed to create an affected media area 520. When a low current density focused beam 506 is applied to the media 508 surface, different rates of current flow are detected by the amplifier 514 to create reader output. Thus, by affecting the media 508 with the energy from the emitter 500, information is stored in the media using structural phase changed properties of the media. An exemplary phase-change material is InSe.

Figure 6:
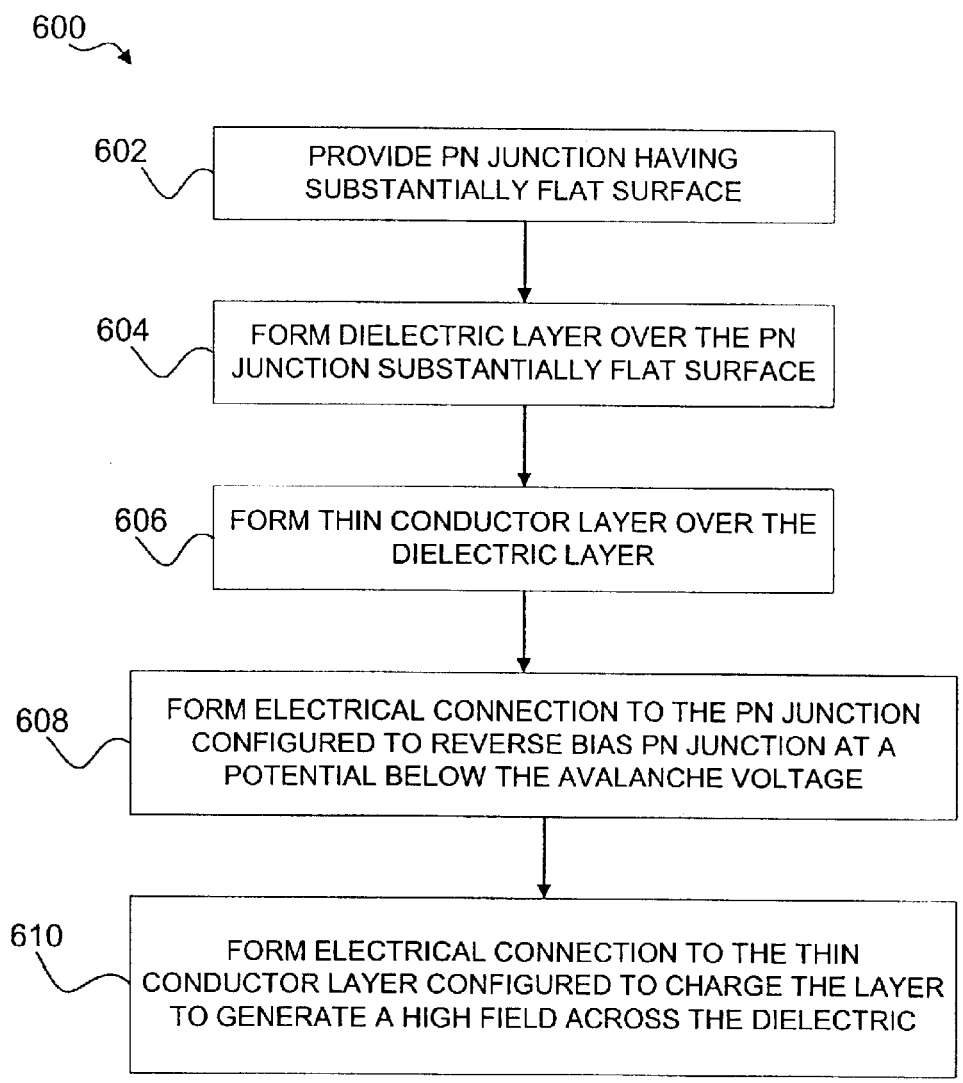
FIG. 6 is a flowchart illustrating a preferred embodiment method of making an emitter of the invention.

Still additional aspects of the invention are directed to methods for making emitters. FIG. 6 is a flowchart illustrating steps of an exemplary method 600 of the invention. In describing the exemplary method 600, consideration of emitters of the invention such as those discussed herein and illustrated in FIGS. 1–5 will be helpful. Indeed, those knowledgeable in the art will appreciate that description of those emitters and devices will be useful in illustrating alternate steps of methods of the invention.

Turning now to FIG. 6, the method 600 includes a step of providing a PN junction having a substantially flat surface (block 602). A dielectric layer is then formed over the PN junction substantially flat surface (block 604), with a thin conductor layer then formed over the dielectric layer (block 606). The PN junction, dielectric layer, and thin conductor layer may be, by way of example, consistent in materials, dimensions, and configuration with the elements 12, 30, and 32, respectively, of the emitter 10 illustrated in FIG. 1.

The method 600 next comprises the step of forming an electrical connection to the PN junction configured to apply a voltage to the PN junction for reverse biasing the junction (block 608). The connection is preferably configured to apply a voltage below the avalanche voltage of the PN junction. The method also includes a step of forming an electrical connection to the thin conductor layer configured to charge the layer to generate a high field across the dielectric layer (block 610). Other exemplary method steps may include providing targets, focusing means and integrated circuits, for example, as will be appreciated in considering the exemplary emitter devices of FIGS. 2–5.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, it will be appreciated that many applications in addition to a memory and a visual display may be practiced using an emitter of the invention.

Various features of the invention are set forth in the appended claims.

What is claimed is:

1. An emitter comprising:
    a PN junction;
    a conducting layer; and
    a dielectric layer sandwiched between said PN junction and said conducting layer and arranged to permit electrons to tunnel through said dielectric layer and be emitted from said conducting layer when a potential applied to said conducting layer creates an electric field across said dielectric layer.

2. An emitter as defined by claim 1 wherein said PN junction has a substantially flat surface, said conducting layer overlying said PN junction substantially flat surface.

3. An emitter as defined by claim 1 wherein said PN junction is configured for reverse biasing at a potential below the PN junction avalanche voltage.

4. An emitter as defined by claim 1 wherein said conducting layer is configured for generating a high field across said dielectric layer.

5. An emitter as defined by claim 1 and further including a first potential connected to said PN junction and configured to reverse bias said PN junction using a voltage less than the avalanche voltage of said PN junction, and further including a second potential connected to said conducting layer and configured to charge said conducting layer sufficient to cause a high field to be created across said dielectric layer.

6. An emitter as defined by claim 1 wherein the emitter is configured to emit at least about 6% of hot electrons generated within said PN junction when said PN junction is reverse biased.

7. An emitter as defined by claim 1 wherein said conducting layer is metal, and has a thickness of between about 3 and about 15 nm.

8. An emitter as defined by claim 1 wherein said dielectric layer is a metal oxide, and has a thickness of between about 5 and about 25 nm.

9. An emitter as defined by claim 1 wherein said dielectric layer is a low-k dielectric.

10. An emitter as defined by claim 1 wherein said dielectric layer is porous.

11. An emitter as defined by claim 1 wherein at least a portion of a surface of said PN junction has an emission center density of at least about $10_5$/micron$_2$.

12. An emitter as defined by claim 1 wherein said PN junction comprises:
    a first N region substantially surrounding a perimeter of a second N region, said second N region having a lower doping concentration than said first N region; and
    at least a first and a second P region, said second P region having a doping concentration higher than said first P region, said second P region interfacing with said second N region and separated from said first N region.

13. An emitter as defined by claim 1 wherein said PN junction includes a contact diode and an emission diode.

14. An emitter as defined by claim 1 and further including a target, said conducting layer configured to direct said emitted electrons towards said target and to cause an effect on said target upon impact.

15. An emitter as defined by claim 14 wherein said target comprises one of a memory or a display.

16. An emitter as defined by claim 14 and further including focusing means positioned between said target and said PN junction.

17. An emitter as defined by claim 16 wherein said focusing means comprises an electrostatic focusing lens having an aperture in a conductor set at a predetermined voltage, said conductor voltage adjustable to change the focusing effect of said focusing lens.

18. An emitter as defined by claim 14 wherein said target comprises a memory, and wherein said effect comprises a physical change to said target, said physical change detectable through measurement of electrical properties of said memory.

19. An emitter as defined by claim 14 wherein said target comprises a display having a plurality of pixels, and wherein said effect comprises a visual change in one of said pixels when said emitted electrons are received by said one of said pixels.

20. An emitter as defined by claim 14 and further including a mover connected to one of said electron source or said target for moving said one of said electron source or said target.

21. An integrated circuit including a plurality of the emitters as defined by claim 1 and further including control circuitry connected to said plurality of emitters.

22. An emitter device including a plurality of emitters as defined by claim 1 arranged in an array, further including a memory, and further including a plurality of focusing lens arranged to cooperate with said array of emitters, each of said focusing lens configured to focus electrons emitted from one of said emitters and direct said focused electrons towards said memory, said focused electrons causing a structural phase change in said memory upon impact, and an integrated reader circuit for detecting said structural phase change through measurement of electrical properties.

23. An emitter comprising:
    a PN junction;
    a conducting layer; and
    a dielectric layer sandwiched between said PN junction and said conducting layer wherein said dielectric layer comprises a first dielectric layer, and further including a second dielectric layer on said PN junction, said second dielectric layer having at least one well defined therein, said first dielectric layer being disposed within said at least one well.

24. An emitter comprising:

a PN junction;

a conducting layer; and a dielectric layer sandwiched between said PN junction and said conducting layer wherein said conducting layer has a plurality of nanoholes having a width of between about 1 and about 10 nm.

25. An emitter device comprising:

a PN junction having a substantially flat surface;

a thin dielectric layer on said substantially flat surface;

a conducting layer on said thin dielectric layer;

a first electrical connection configured to apply a voltage below the avalanche voltage to said PN junction to reverse bias said PN junction; and a second electrical connection configured to charge said conducting layer to create a high field across said dielectric layer.

26. An integrated circuit including a plurality of emitter devices as defined by claim 25, each of said plurality of emitter devices connected to a control circuit, and a target medium.

* * * * *